United States Patent [19]
Chuang

[11] Patent Number: 5,054,686
[45] Date of Patent: Oct. 8, 1991

[54] AUTOMOBILE ENVIRONMENT MANAGEMENT SYSTEM

[75] Inventor: Cliff L. Chuang, Lowell, Mass.
[73] Assignee: Prospect Corporation, Lowell, Mass.
[21] Appl. No.: 609,266
[22] Filed: Nov. 5, 1990
[51] Int. Cl.$^5$ ............................ F24F 7/00; B60H 1/00
[52] U.S. Cl. .................................... 236/49.3; 98/2.01; 236/1 R; 236/91 C
[58] Field of Search .................. 236/49.3, 1 R, 91 C; 98/2.01

[56] References Cited

U.S. PATENT DOCUMENTS

| 4,107,941 | 8/1978 | Hamilton | 236/1 R |
| 4,852,469 | 8/1989 | Chuang | 98/2.01 |

FOREIGN PATENT DOCUMENTS

0013216  2/1981  Japan ................................ 236/91 C
0167312  9/1984  Japan ................................ 98/2.01

Primary Examiner—William E. Wayner
Attorney, Agent, or Firm—Iandiorio & Dingman

[57] ABSTRACT

An automatic venting system for a vehicle having a plurality of motor operated vents in which the interior of the vehicle is monitored for the temperature as well as the presence of a living being, and a separate sensor is included for sensing precipitation outside the vehicle. When the interior of the vehicle is above a preselected threshold temperature, at least one of the vehicle vents is at least partially opened to cool the vehicle. Then, if precipitation is sensed, the open vent or vents are automatically closed unless a living being is sensed within the interior of the car, in which case one or more of the vents remains at least partially open even during the precipitation to provide sufficient ventilation and safety for the being in the car.

28 Claims, 7 Drawing Sheets

AUTOMOBILE ENVIRONMENT MANAGEMENT SYSTEM

FIELD OF INVENTION

This invention relates to an automobile environment management system in which open automobile windows are automatically closed when precipitation is detected unless there is a person in the vehicle.

BACKGROUND OF INVENTION

There have been several attempts to automatically ventilate a vehicle. One such system employs ventilation blowers which are automatically operated when the car key is turned off. That system is expensive to implement and unacceptably drains the battery in use.

Another system as disclosed in my previously issued U.S. Pat. No. 4,852,469 accomplishes ventilation by opening one or more of the car vents, such as the windows, sunroof or convertible top, when the temperature inside the car is higher than desired. If precipitation is sensed, that system automatically shuts the opened vents.

I have now improved my patented system by adding a number of features which resolve some of the drawbacks of my patented system. For one, my patented system closes the open windows when precipitation is sensed regardless of whether or not the vehicle is occupied. Accordingly, if a child or pet is left in the car and it begins to rain, proper ventilation for the car occupants will not be provided. This can be uncomfortable. In addition, on hot, sunny days, my patented system may not provide sufficient interior cooling due to the fact that the sun will continue to beat down in the car, causing the seats and other parts of the car to become very hot, even if there is air flow through one or more open windows. Another drawback of my system is that it does not account for the possibility of an obstruction which may be present when the windows are automatically closed. If such an obstruction is present, the window motor can burn out. In addition, the obstruction could be a child's finger or hand, for example. In that case, since the windows close without warning as soon as the precipitation begins, the child may be injured.

It would also be desirable in an automobile environment control system to account for problems created by cool or cold weather. For example, if the car windows are left open in the cold, or it becomes cold, it would be desirable to have the windows close. Finally, there is the consideration that it would be desirable to automatically heat the steering wheel on cold days to provide a more comfortable vehicle environment.

SUMMARY OF INVENTION

It is therefore an object of this invention to provide an automobile environment management system which is safe even if there are occupants in the vehicle when the system is operating.

It is a further object of this invention to provide such a system which automatically stops and reverses the window closure on detection of an obstruction.

It is a further object of this invention to provide such a system which provides a warning that the system is enabled and warns when one or more of the vehicle vents is about to be operated.

It is a further object of this invention to provide such a system which automatically ventilates the car if dangerous gases are present.

It is a further object of this invention to provide such a system which allows the user to determine how far the windows will open when the car automatically vents.

It is a further object of this invention to provide such a system which includes protection for the window drive motor.

It is a further object of this invention to provide such a system which automatically shades the car interior on hot sunny days.

It is a further object of this invention to provide such a system which automatically warms the steering wheel on cold days.

This invention features an automatic venting system for a vehicle having a plurality of motor operated vents such as windows, a sunroof, and/or a convertible top, the system including means for resolving the vehicle interior temperature, means for detecting the presence of a living being in the vehicle, and means for sensing precipitation outside the vehicle. The system includes means, responsive to the means for resolving the temperature, for operating at least one of the vent motors to at least partially open the respective vehicle vent when the interior temperature rises above a preselected threshold temperature in order to cool the vehicle. Further included are means, responsive to the means for sensing, for commanding the vent motor of at least one open vehicle vent to close the vent when precipitation is sensed. The system also includes means, responsive to the means for detecting the presence of a living being in the car, for inhibiting the window closure operation when a being is present in the vehicle to prevent at least one open vent from closing in order to provide fresh air for the being and to protect the being from injury. Preferably, when the living being leaves the car, the open vent or vents are commanded to close.

The living being detection may be accomplished with an infrared detector or a motion sensor such as a mercury switch, a microwave sensor, or a photoelectric device. The system may further include means for selecting the open amount of the vent to be opened by the means for operating. In that case, the means for operating preferably includes means for choosing which of the vehicle vents are to be opened to cool the vehicle. The means for selecting may then provide independent open amount selection for each chosen vehicle vent.

Preferably, the system further includes means, responsive to the means for sensing, for warning that at least one open vehicle vent is about close. Further included may be means for indicating that the venting system is in operation, which may be accomplished with an audible and/or visible light warning system.

In an alternative embodiment, the system includes means for detecting the presence of a dangerous gas in the vehicle interior. In that case, the means for operating may be further responsive to the means for detecting the gas for at least partially opening at least one vehicle vent when the dangerous gas is detected to vent the gas from the vehicle. In that case, the means for detecting the gas may inhibit operation of the means for commanding the window closure to prevent the open vent from closing while the dangerous gas is present.

In another preferred embodiment, the system includes means for determining when a vent being closed is obstructed. In that case, the means for commanding may be inhibited by the means for determining when the vent is obstructed to stop the vent closure on detection of an obstruction. Then, the means for operating the vents may be enabled by the means for determining when a vent is obstructed for reopening the obstructed vent. In that case, the means for commanding the window closure preferably again attempts to close the obstructed vent after it is reopened. There may further be included means for determining the number of times that the vent has been commanded to close in a predetermined closure period, in which case the means for commanding the closure may be responsive to the number of times the vent has been commanded to close to cease the attempts to close the obstructed vent after a number of tries.

The system may further include a means for determining when the vehicle is violently jarred, in which case the means for operating the windows is responsive to the jarring of the vehicle for fully opening all the motor operated vents when the vehicle is jarred to provide a vehicle escape path in case of an accident.

Preferably, the system further includes means for detecting sunlight in the vehicle. In that case, there are including means for shading at least part of one of the vehicle windshields, in which case the means for shading is responsive to the means for resolving the vehicle temperature as well as the means for detecting sunlight for operating the shades when the interior temperature is above the preselected threshold and sunlight is detected.

The system may also include means for determining when all the vehicle doors are locked. In that case, the means for commanding may be enabled to close all of the motor operated vents when the means for detecting a living being detects the presence of a person in the car after all the doors are locked. This arrangement deters vehicle theft or unauthorized entry.

For operation in cold weather environments, the means for commanding the vent closures may be further responsive to the means for resolving the interior temperature for closing the open vents when the interior temperature falls below a preselected threshold temperature. The system may then further include means for heating the vehicle steering wheel, in which case the means for heating is preferably responsive to the means for resolving the temperature for only heating the steering wheel when the interior temperature falls below the preselected threshold temperature.

DISCLOSURE OF PREFERRED EMBODIMENT

Other objects, features and advantages will occur to those skilled in the art from the following description of a preferred embodiment and the accompanying drawings, in which.

This invention may be accomplished by an automatic venting system for a vehicle which has a number of motor operated vents, such as the windows, sunroof, and/or convertible top. The system determines the vehicle interior temperature, senses precipitation outside the vehicle, and senses the presence of a living being inside the vehicle. When the car interior rises above a preselected threshold temperature, one or more of the vehicle vents are opened. Then, when precipitation is sensed, one or more of the open vents is closed. However, if a living being such as a child or animal is detected in the automobile, at least one of those vents remains open to provide fresh air for the occupant, and to prevent the vents from closing on an occupant.

Figure 1:
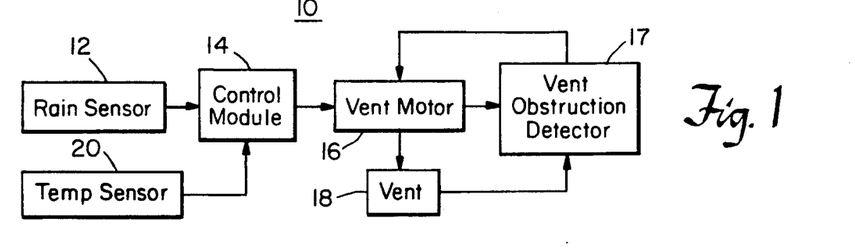
FIG. 1 is a schematic block diagram of an automobile environment management system according to this invention.

There is shown in FIG. 1 automobile environment management system 10 according to this invention. System 10 includes control module 14 responsive to temperature sensor 20 placed in the interior of the car, and precipitation sensor 12 placed on the exterior of the car. Temperature sensor 20 may be a thermocouple for supplying a signal to control module 14 relating to the vehicle interior temperature. Rain sensor 12 may be, for example, a printed circuit board with closely spaced, exposed, contacts which are shortened by the presence of water to send a signal to control module 14 indicating that there is precipitation falling outside the car.

System 10 is adapted for use with automobiles which include one or more vents, such as windows, sunroof and/or a convertible top each of which is operated by a vent motor such as motor 16.

As is described in more detail below, system 10 automatically enables motor 16 to open vent 18 at least partially when temperature sensor 20 senses an unacceptably high temperature in the interior of the vehicle. When precipitation is sensed by sensor 12, module 14 enables motor 16 to close vent 18. Vent obstruction detector 17 determines if vent 18 is obstructed and if so, control module 14 reverses motor 16 to back vent 18 off the obstruction. The window closure may be attempted one or more times before module 14 leaves the window in at least a partially opened state so that the obstruction may be removed.

Obstruction detector 17 may be accomplished with a switching device placed at the end of the closing path of vent 18 to signal when the vent is closed used in combination with either a timing circuit or a vent motor stall current detector. When a timing circuit is employed, detector 17 signals an obstruction if the switch is not closed within the normal window closure time. Alternatively, the vent motor stall current detector may be employed to signal when the motor is drawing a higher than normal current, indicating that the window path is obstructed. In that case, since the vent motor may briefly draw such high current when the window closes, obstruction detection is accomplished by employing the stall current detector in conjunction with a window limit switch placed at the window closed position, which indicates that the window is fully closed rather than obstructed. In any case, the inclusion of vent obstruction detector 17 prevents the window from closing on and injuring a child or an animal and also prevents vent motor 16 from burning out.

Figure 2:
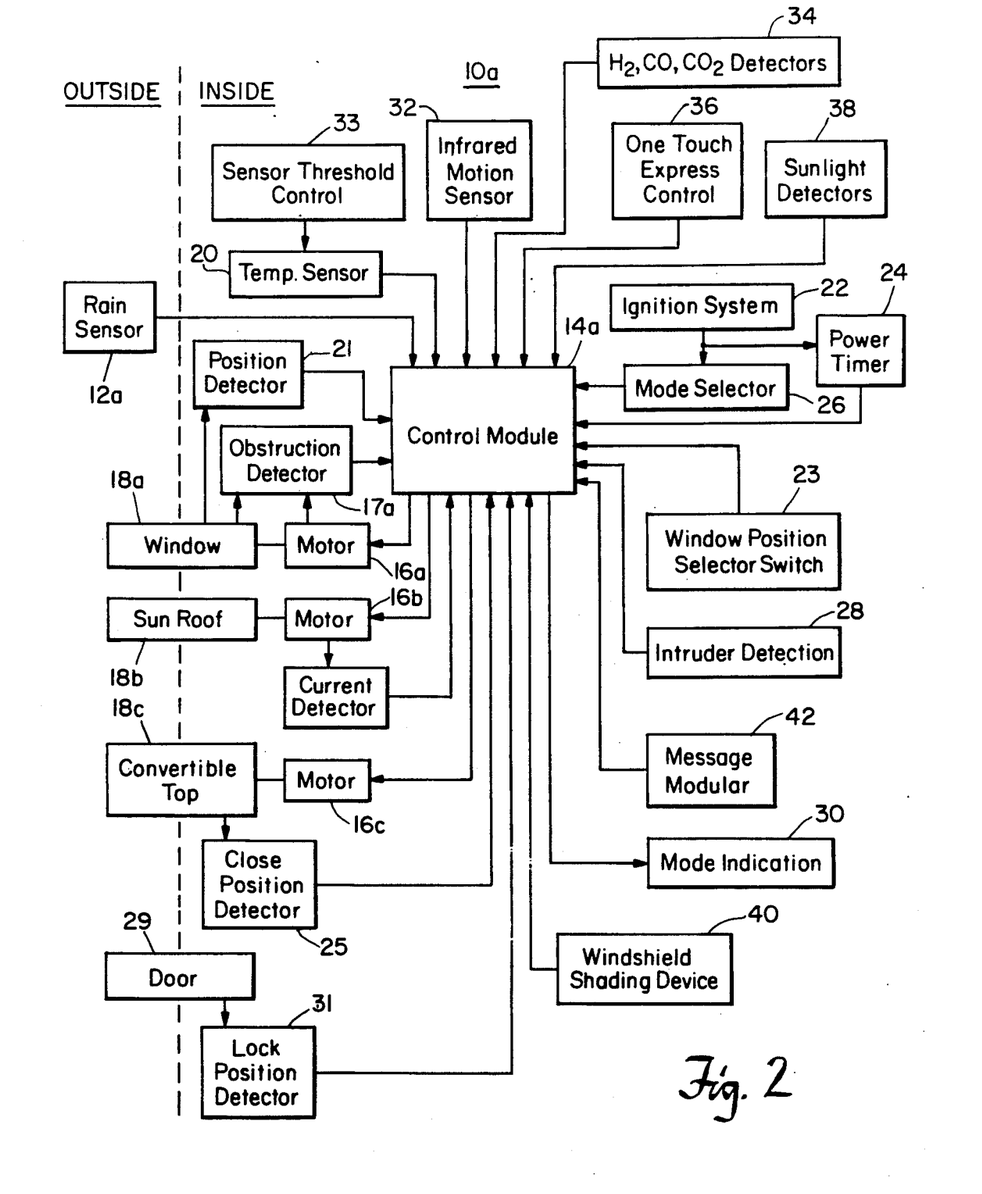
FIG. 2 is a more detailed block diagram of an alternative automobile environment management system according to this invention.

A much more detailed embodiment of system 10a according to this invention is schematically depicted in FIG. 2. In this example, the vehicle includes window 18a, sunroof 18b, convertible top 18c and door 29 which span the dividing line between the inside of the car and the outside of the car. Window obstruction detector 17a is responsive to window 18a and/or window motor 16a as described above for, either singly or in combination with window position detector 21, enabling control module 14a to open the window if an obstruction is detected and attempt window closure one or more times before halting the attempts to prevent motor 16a from burning out. It should be understood that such obstruction detection may also be provided for sunroof 18b and/or convertible top 18c. In the event that obstruction detection is accomplished with a timing circuit, closed position detector 25 may be employed without the need for an obstruction detector such as that shown at 17a.

System 10a includes temperature sensor 20 placed inside the car and having sensor threshold control 33 which allows the user to establish one or more of a high temperature and low temperature set point. When sensor 20 detects a temperature greater than the set point, control module 14 is enabled to open one or more of the window, sunroof, and convertible top, as is further explained below.

System 10a is enabled by switching the ignition key of ignition system 22 to the off position. The operator of the vehicle is then allowed to select from one or more different operation modes, as described below, employing mode selector switch 26. Selection of a particular mode is confirmed either audibly or by a series of LEDs by mode indication unit 30. The operation of system 10a in the typical operating modes is described in more detail below.

Once system 10a is enabled, timer 24 permits operation of the system for a preselected period of time, after which all the vents are closed and the system is disabled. Similarly, intruder detection module 28 provides for immediate closure of all open vents when unauthorized vehicle entry is detected after all the doors to the vehicle have been locked as indicated by lock position detector 31. Intruder detection may be accomplished by using one or more of the infrared and motion sensors 32, which may include an interior infrared sensor for detecting the presence of a warm body (living being) in the car, an interior motion sensor for detecting the presence of a moving object in the car, or an automobile motion sensor which detects the sudden movement of the entire car or a part of the car such as a door, indicating that someone is entering the car. If one or more of such detections take place while the vehicle door locks are down, system 10a interprets this as the presence of an intruder and immediately closes all the vents as described more fully below.

Figure 9A:
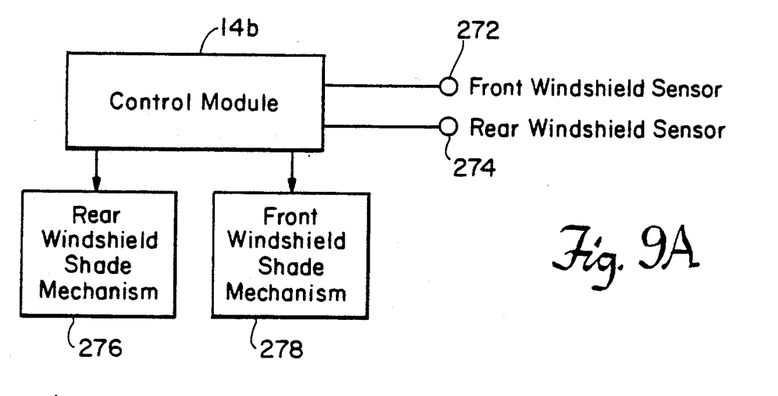
FIGS. 9A, 9B, 9C are block and schematic diagrams of the automatic window shading of the system of this invention.
Figure 9B:
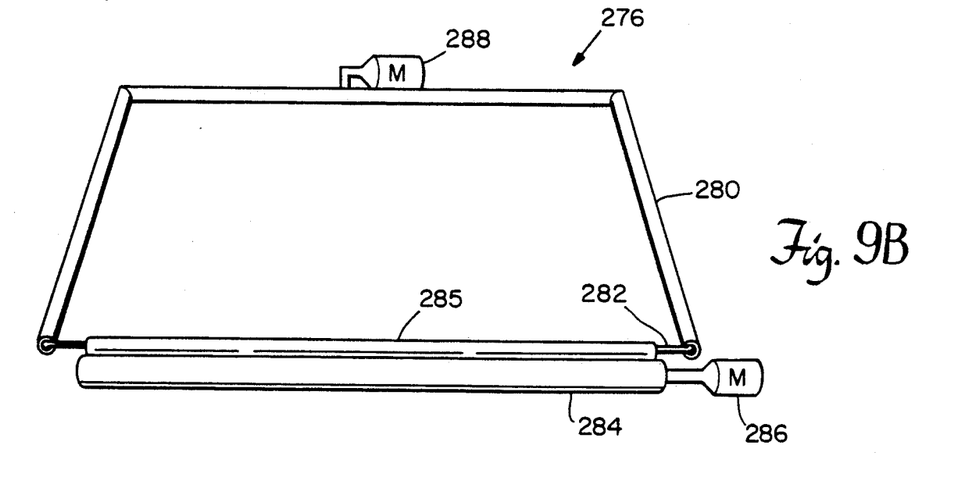
Figure 9C:
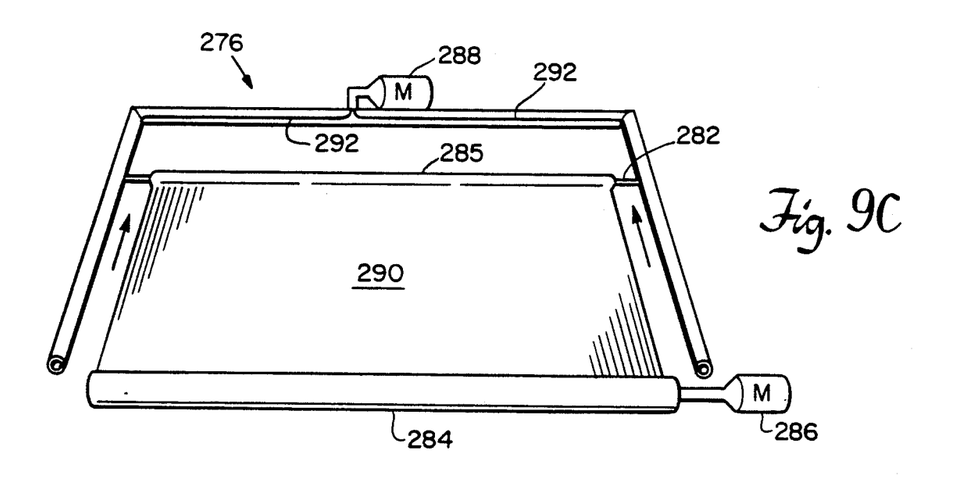

System 10a also includes sunlight detectors 38 for enabling the operation of automatic window shades, further described below in conjunction with FIG. 9, which help to keep the interior of the vehicle cool. System 10a may also include one or more dangerous gas detectors 34 for detecting, for example, the presence of carbon monoxide, carbon dioxide, and/or fuel gases such as hydrogen or natural gas within the interior of the car. Such gas detection may be accomplished with infrared, laser, or chemical reaction detection devices, or other chemical sensing devices known in the art which signal the presence of a gas or a particular dangerous concentration of a gas. In that case, control module 14a is enabled to immediately open one or preferably all of the vehicle vents and keep them open until the level of dangerous gas has subsided.

System 10a may also include message modular 42 for providing the audio messages used by system 10a, such as a human voice message for indicating when a particular operating mode has been selected or when one or more of the vents is about to be operated. Alternatively, the message may be relayed by a series of bell or buzzer sounds.

One touch express control 36, described in more detail below in conjunction with FIG. 5, allows the user to open or close all the car windows with a single touch of window position selection switch 23. Control 36 may also be used to allow the user to program the amount each of the vents is to be opened during automatic system operation, as is also further described below.

FIGS. 3A through 7 depict the operation of system 10a according to this invention. Operating flow chart 120, FIG. 3A, begins with start step 122 followed by a check of whether or not the power switch for the system is on, step 124. If it is, and the ignition key is on, step 126, the automatic vent control of this invention is not enabled. However, when the key is on, the system monitors the windshield shades, step 132, further described below. If the shades are drawn, they are removed from the windshields, step 134, and operation returns to step 126.

Figure 3A:
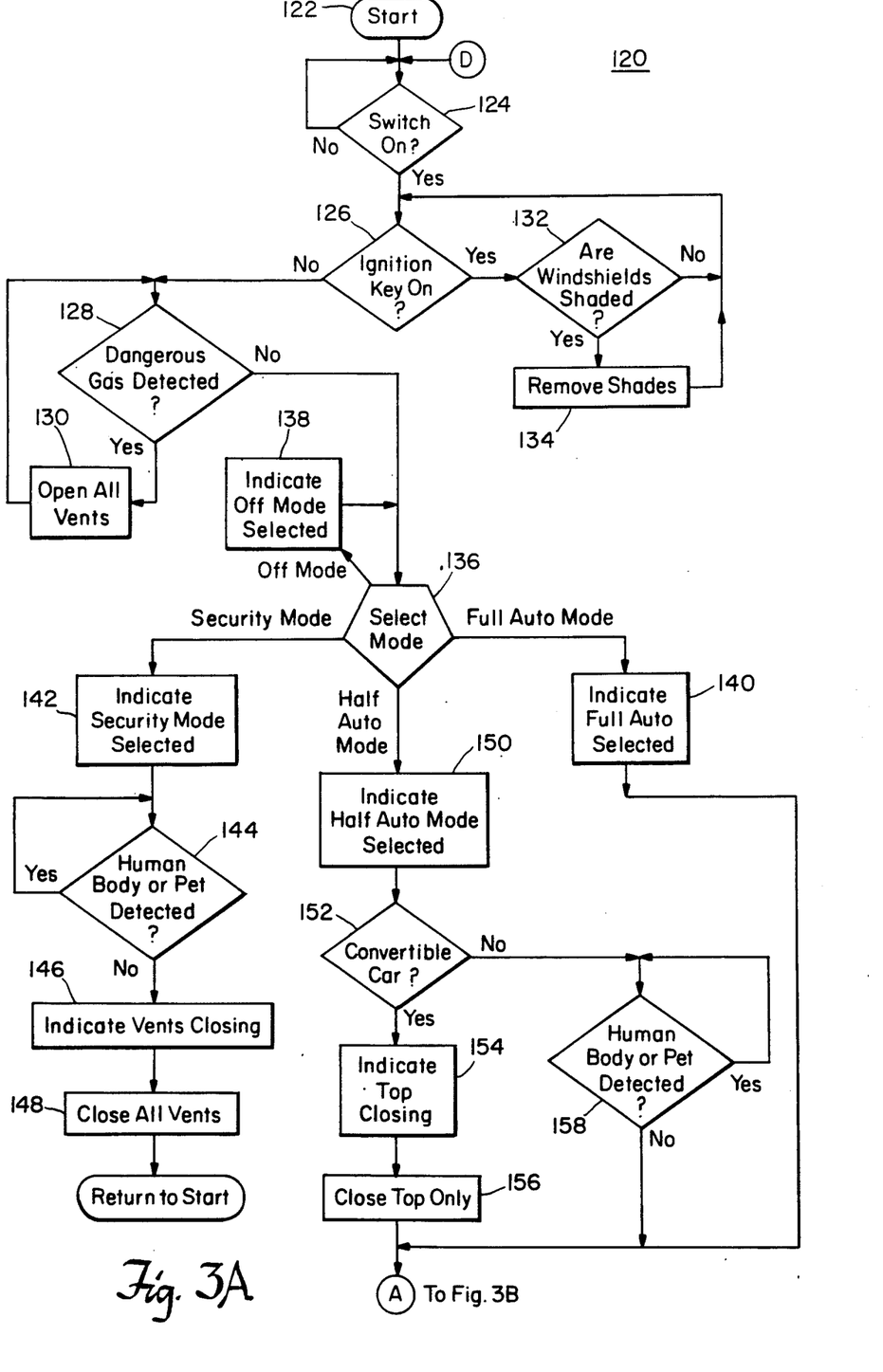
FIGS. 3A, 3B, 3C, 4, 5, 6 and 7 are flow charts of the operation of the system of FIG. 2.

When the ignition key is shut off, the system proceeds to step 128 in which detectors 34 are monitored for detection of a dangerous level of gas. If a dangerous level is present, all the vents are opened, step 130. Operation cycles through these two steps so that all the vents remain open while dangerous levels of gas are present. When dangerous levels of gas are no longer detected, operation proceeds to step 136, which provides for user selection of the operating mode, designated as the "off mode", the "security mode", the "half auto mode", and the "full auto mode". If the off mode is selected, the mode is indicated, step 138, and operation cycles back to the select mode step, 136. If the full auto mode is selected, the mode is indicated, step 140, and operation proceeds to step 62, FIG. 3B. If the security mode is chosen, the mode is indicated to the vehicle occupants at step 142, and in step 144 sensors 32 are monitored for the detection of a living being such as a human or a pet. If such is detected, operation does not proceed, so that any open vents will not close. If there are no beings detected, the system indicates that the vents are about to close and then closes all of the vents, steps 146 and 148. Thus, in the security mode, the system waits until all the occupants have left the car and then automatically closes all the vehicle vents. Accordingly, the security mode is useful for persons who forget to close the windows or sunroof, or ones who desire to always have all the vents closed, as would typically be needed in a city.

If the half auto mode is selected, the selection is indicted, step 150, and if the car is a convertible, step 152, the system indicates that the top is closing and closes the top, steps 154 and 156. If the car is not a convertible, the system monitors for the presence of a living being, step 158. If a being is not present, operation proceeds to FIG. 3B. If one is present, operation remains at step 158 so that the vents will not close if a person or pet is in the car. Alternatively, operation could proceed for all but at least one vent, which would always remain at least partially opened when a living being is in the car to provide sufficient ventilation; the remaining vents could conceivably be operated.

Figure 3B:
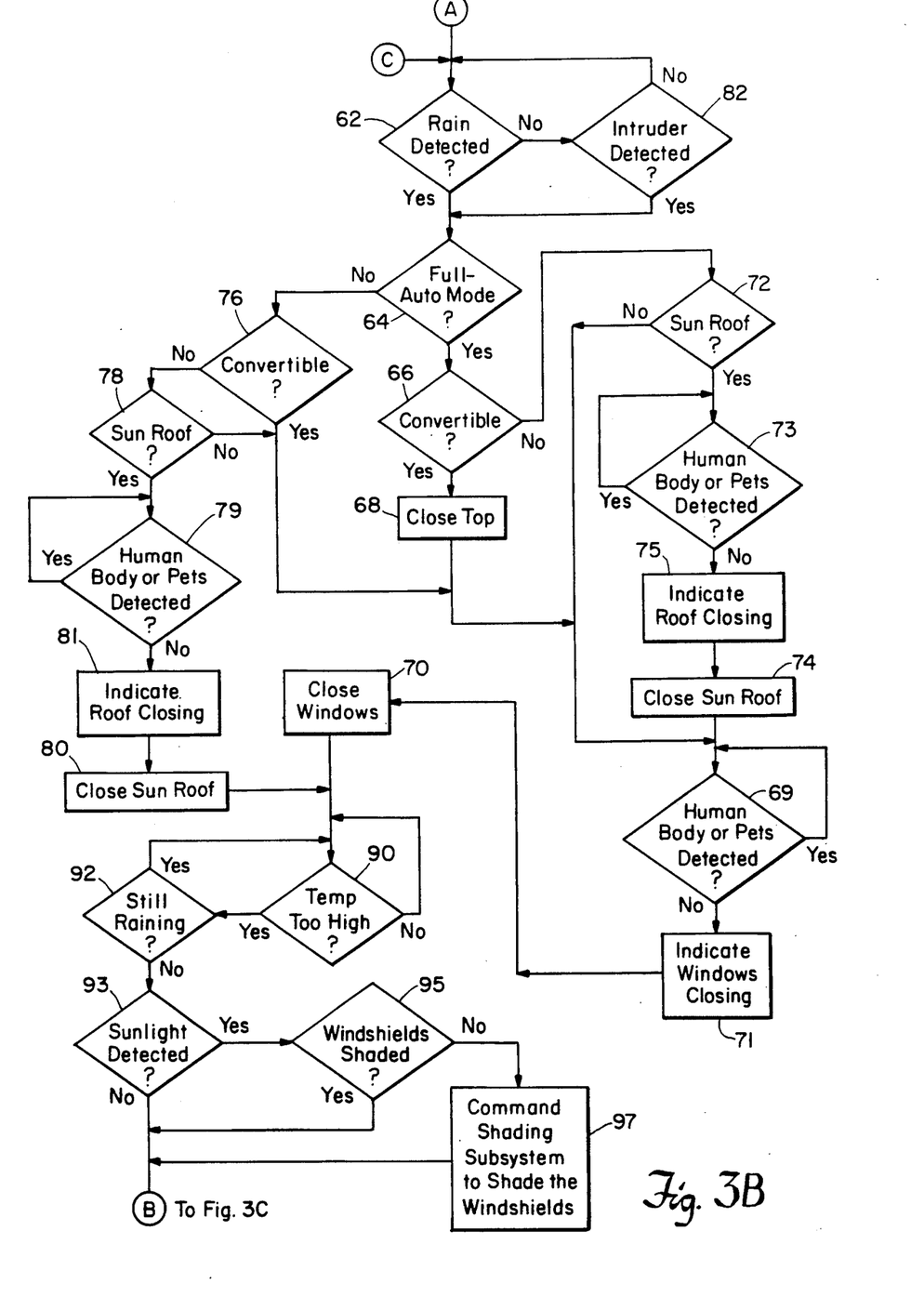

At the next step, 62, if precipitation is detected, operation proceeds to step 64. While it is not raining (or snowing) the intruder detector is monitored, step 82. If an intruder is detected, operation immediately proceeds to step 64 regardless of whether precipitation is sensed. If in the full auto mode, step 64, and if the car is a convertible, step 66, the top is closed, step 68, and the interior is monitored for a living being, step 69. If one is not present, at step 71 the system indicates that the vents are closing and closes all the windows. If the car is not a convertible, and has a sunroof, step 72, the system monitors the interior of the car for the presence of a living being, step 73, and if one is not detected indicates that the sunroof is closing, step 75, and closes the sunroof, step 74. Operation then proceeds to step 69 wherein the interior is monitored and, if no one is present, the system indicates that the windows are closing and then closes the windows, step 70. Operation then proceeds to monitor the interior temperature, step 90. When the temperature is too high, and it is not raining, step 92, operation proceeds to step 93. If it is raining, operation loops back to step 90.

Figure 3C:
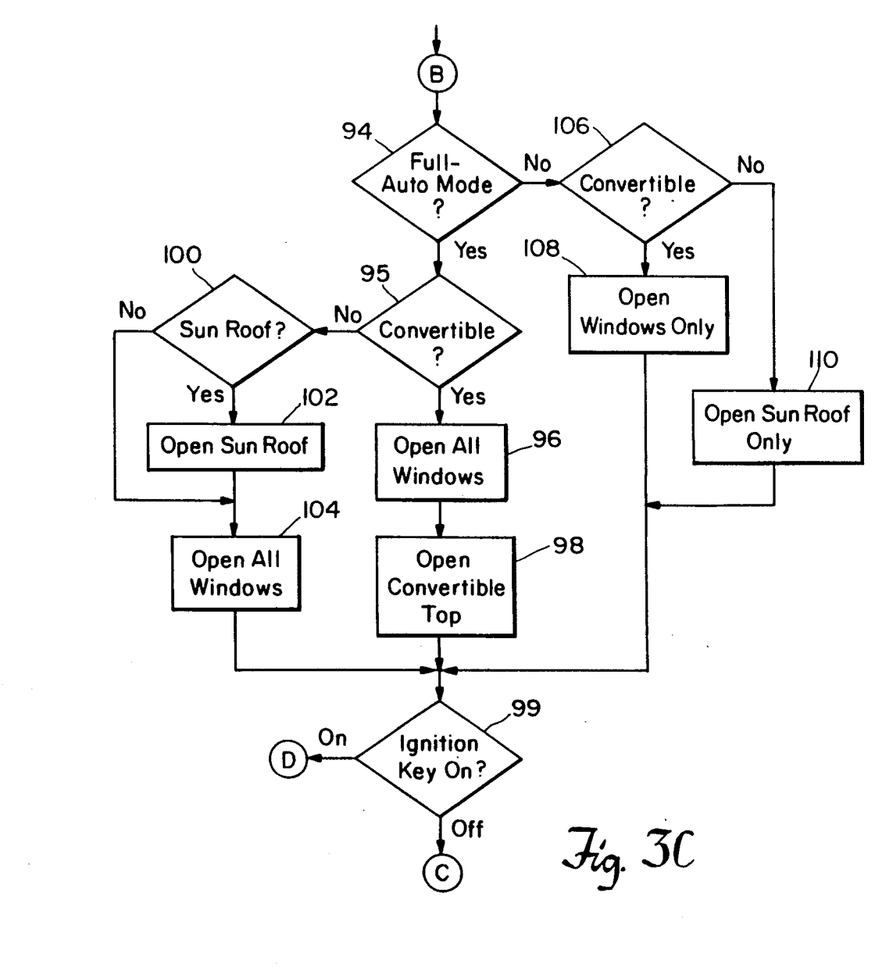

If it is not raining, and sunlight is not detected, operation proceeds to step 94, FIG. 3C. If sunlight is detected, and the windshields are shaded, operation also proceeds to step 94. However, if the windshields are not shaded, the shading sub system is commanded to shade the windshield or windshields, step 97, and operation proceeds to step 94.

If full auto mode is not selected, step 64, and the car is a convertible, step 76, operation proceeds to step 69. If the car is not a convertible and does not have a sunroof, step 78, operation also proceeds to step 69. If the car does have a sunroof, the interior is monitored for a being, step 79. When one is not present at step 81 the system indicates that the roof is closing and closes the sunroof, steps 81 and 80. Operation then proceeds to step 90.

At step 94, if full automatic mode has been selected and the car is a convertible, step 95, all the windows are opened as well as the top, steps 96 and 98. If the car is not a convertible, but has a sunroof, step 100, the sun roof is opened, step 102. If there is no sunroof, or after the sunroof has been opened, all the windows are opened, step 104. If full automatic mode was not selected, operation proceeds to step 106 and if the car is a convertible, only the windows are opened. If the car is not a convertible, only the sunroof is opened, step 110. Operation then proceeds from all branches to step 99 where the ignition key is monitored. If the key is on, operation proceeds back to step 124, FIG. 3A. If the key is off, operation proceeds to step 62, FIG. 3B.

Figure 4:
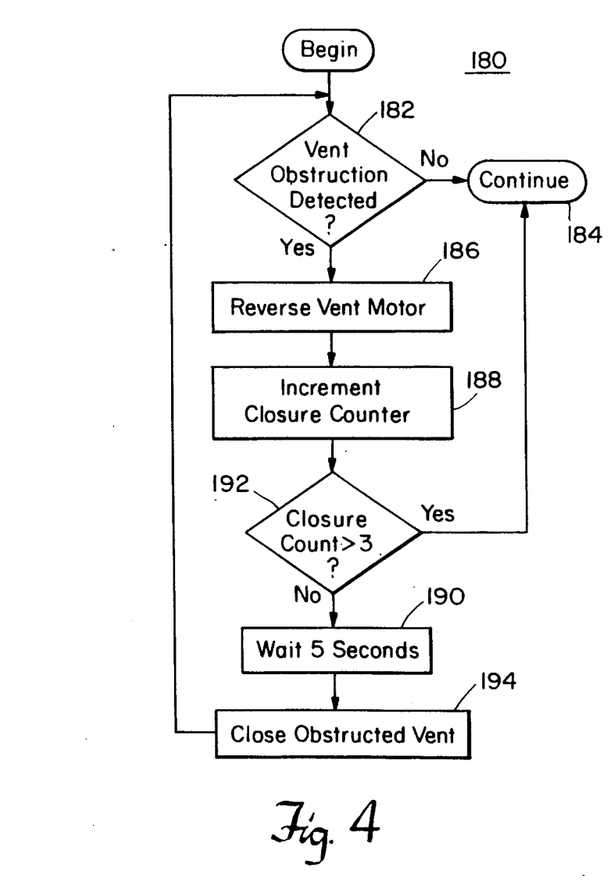

The operation of the vent obstruction detection system 180 is shown in FIG. 4. This system is employed in an alternative embodiment of the system described above as part of each vent closing step. If a vent obstruction is detected while the vent is being closed, step 182, the vent motor is reversed, step 186 and a vent closure counter is incremented, step 188. If the closure count is greater than a preselected number, for example three, at step 192 the operation continues, step 184. The result is that if the obstruction remains present for more than three tries at closing that vent, the vent will remain open. If more than the preselected number of closures has not yet occurred, the system waits for a predetermined time such as five seconds, step 190, and re-closes the obstructed vent, step 194, at which point operation proceeds back to step 182 to cycle through again to attempt up to three vent closures before the operation of the system proceeds with the vent left open. Alternatively, the window could be left at the position in which it jammed by providing the closure count step 192 before the vent reverse step 186.

Figure 5:
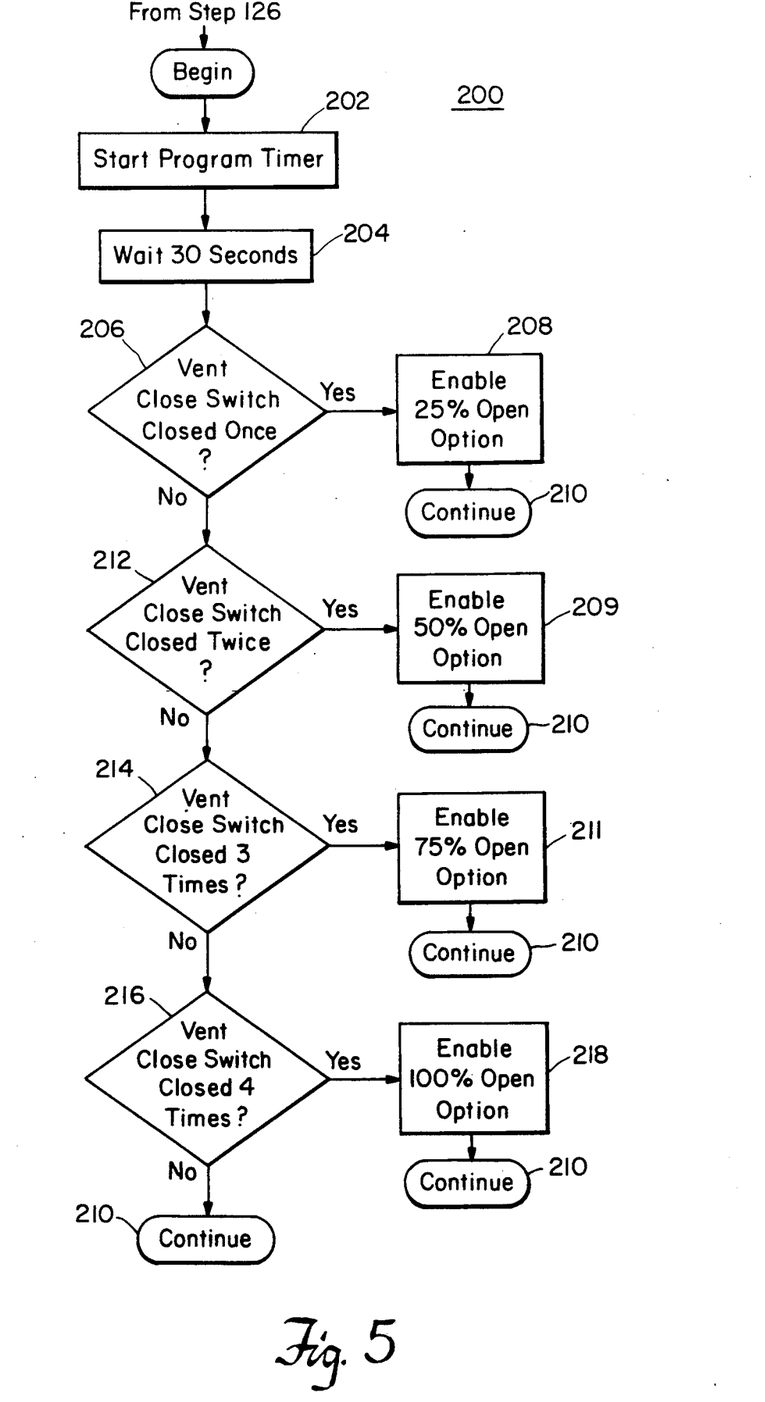

FIG. 5 details the operation of system 200 which allows the user to preprogram the amount that each vent is opened when in the full or half automatic mode as described above. Preferably, this system is included immediately after the detection that the ignition key is off so that the user may program the windows each time the car is shut off and the system of this invention enabled. Operation starts with the starting of the program timer, step 202, which times out a preselected amount of time, such as 30 seconds, during which the user can program the window opening. After the time has expired, step 204, at steps 206, 212, 214 and 216 the number of times the vent switch has been closed and opened during that 30 second time period is counted. In the embodiment shown, the user may close the switch between one to four times to set the amount of window opening between 25% and 100%, respectively, of its full open position, as shown in steps 208, 209, 211 and 218. This is but one embodiment of system 200 according to this invention and is not meant to be limiting, as less than or more than four positions may be chosen, along with the amount that the windows are opened for each closure of the window switch. In addition, the system is preferably separately provided for each of the window switches, allowing separate programming of each window, sunroof, or convertible top. Alternatively, in cars which have a single switch which operates all the windows, the system may be enabled for that switch so that all the windows move in unison. Preferably, the window opens immediately after programming to the selected amount so that the operator can check to insure that the proper open window position has been accomplished.

Figure 6:
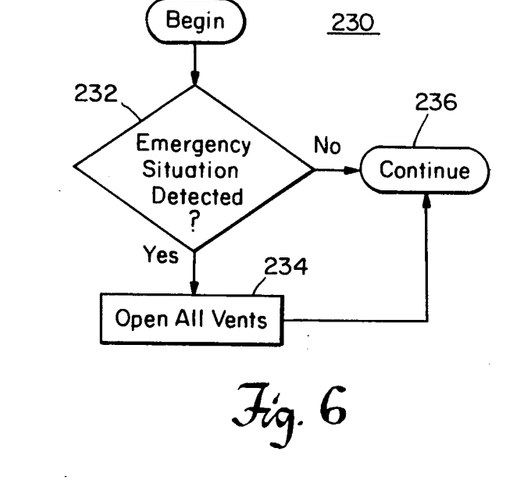

Operating system 230, FIG. 6, discloses the operation of the sub-system in which an emergency situation is detected. Such detection is preferably accomplished with a motion detector such as a mercury switch or a mechanical motion detector such as those used in some seat belt devices which indicate when there has been a sudden acceleration or deceleration of the vehicle, typically caused by an accident. When such a situation is detected, step 232, all the vents are immediately opened, step 234, to provide an automobile exit route for the occupants in the case of an accident. In one embodiment, after step 234, the system may freeze its operation so that all the vents remain open, until the system is again enabled by the user so that the windows will not close, for example, if the accident occurs in the rain or snow.

Figure 7:
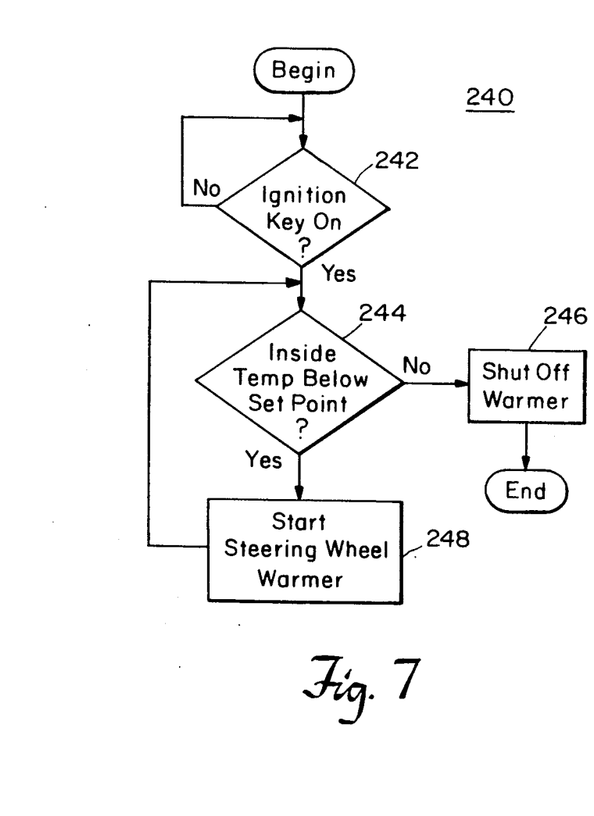

For environments which get cold, it may be desirable to include system 240, FIG. 7, which detects when the ignition key is on, step 242, and if the inside temperature is below a set point, step 244, a steering wheel warmer is started, step 248. When the car interior reaches a preselected set point, for example by the use of the interior car heat, the warmer is shut off, step 246, and operation ends. Preferably, step 240 is enabled immediately after the key is turned on so that the steering wheel warms up as soon as the car is started.

Figure 8:
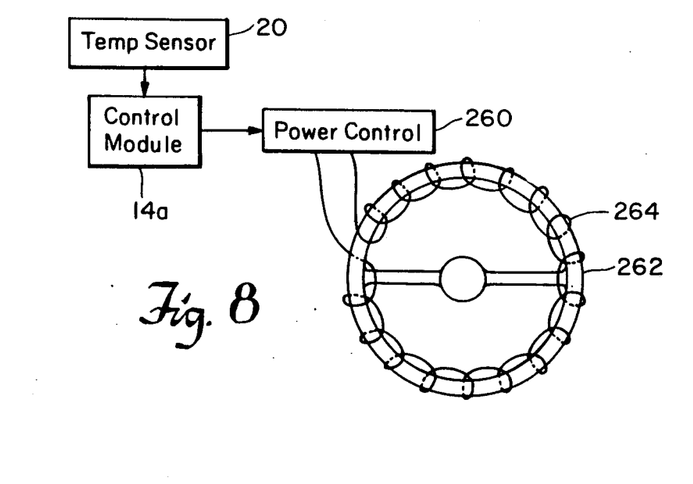
FIG. 8 is a schematic diagram of the automatic steering wheel warming of the system of this invention.

One example of a device which may be used to accomplish the steering wheel warming is shown in FIG. 8, in which resistive heating coil 264 is shown wrapped around steering wheel 262. Alternatively, the coil could be built into the steering wheel or the heating could be accomplished with another type of device such as a warming lamp or high energy device directed at the steering wheel. Warmer power control is enabled to power up warmer 264 by control module 14a in conjunction with temperature sensor 20 for warming the steering wheel when the interior temperature is below a desired set point. In another embodiment, system 240, FIG. 7, enables all the automobile vents to close when the inside temperature is below a certain set point. In that case, system 240 may be employed to operate when the ignition key is off and the ventilation system of this invention is enabled so that if the windows are left open, or if they are opened by the ventilation system, they will close if the interior temperature becomes too low.

The automatic windshield shading described above is shown in more detail in FIGS. 9A through 9C. Rear windshield shade mechanism 276 and front windshield shade mechanism 278, FIG. 9A, are responsive to control module 14b which is itself responsive to front windshield and rear windshield sunlight sensors 272 and 274, respectively. When the sensor detects sunlight, control module 14b enables the associated shade mechanism 276 and/or 278 to shade the windshield so that sunlight is prevented from entering the car through the windshield. One windshield shade mechanism 276 is shown in more detail in FIGS. 9B and 9C, which depict the shade in the open position in FIG. 9B and the shade being closed in FIG. 9C. Mechanism 276 includes c-shaped frame 280 mounted around the outside of the windshield. Horizontal bar 282 spans the opening in frame 280 and is enabled to ride therein to move shade 290 up and down within frame 282. Shade 290 is wrapped around horizontal member 282 as shown by section 285 so that when motor 288 is powered by control module 14b to lift the shade, the shade is lifted using a mechanism such as the interconnecting cables 292. When sunlight is no longer detected and the shade is to be withdrawn, motor 286 is enabled to withdraw the shade back into housing 284. Motor 288 may be operated in conjunction with motor 286 to allow the shade to be withdrawn, or may simply be enabled to spin freely when motor 286 is enabled to allow cable 292 to be withdrawn from motor 288 so that the shade can open.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An automatic venting system for a vehicle having a plurality of motor-operated vents, comprising:
   means for resolving the vehicle interior temperature;
   means for detecting the presence of a living being in the vehicle;
   means for sensing precipitation outside the vehicle;
   means, responsive to said means for resolving, for operating at least one of the motors to at least partially open the respective vehicle vent when the interior temperature rises above a preselected threshold temperature to cool the vehicle;
   means, responsive to said means for sensing, for commanding the motor of at least one open vehicle vent to close the vent when precipitation is sensed; and
   means, responsive to said means for detecting, for inhibiting said means for commanding when a living being is present in the vehicle to prevent at least one open vent from closing for providing fresh air for the being and for the safety of the being.

2. The venting system of claim 1 in which said means for detecting includes an infrared detector.

3. The venting system of claim 1 in which said means for detecting includes a motion sensor.

4. The venting system of claim 1 further including means for selecting the open amount of the vent to be opened by said means for operating.

5. The venting system of claim 4 in which said means for operating includes means for choosing which of the vehicle vents are to be opened to cool the vehicle.

6. The venting system of claim 5 in which said means for selecting provides independent open amount selection for each chosen vehicle vent.

7. The venting system of claim 1 further including means, responsive to said means for sensing, for warning that at least one open vehicle vent is about to close.

8. The venting system of claim 1 further including means for indicating that said venting system is in operation.

9. The venting system of claim 1 further including means for detecting the presence of a dangerous gas in the vehicle interior.

10. The venting system of claim 9 in which said means for operating is further responsive to said means for detecting a gas for at least partially opening a vehicle vent when a dangerous gas is detected to vent the gas from the vehicle.

11. The venting system of claim 10 in which said means for detecting a gas inhibits operation of said means for commanding to prevent the open vent from closing while the dangerous gas is present.

12. The venting system of claim 1 further including means for determining when a vent being closed is obstructed.

13. The venting system of claim 12 in which said means for commanding is inhibited by said means for determining to stop vent closure on detection of an obstruction.

14. The venting system of claim 13 in which said means for operating is enabled by said means for determining for re-opening the obstructed vent.

15. The venting system of claim 14 in which said means for commanding again attempts to close the obstructed vent after it is re-opened.

16. The venting system of claim 15 further including means for determining the number of times the vent has been commanded to close in a predetermined closure period.

17. The venting system of claim 16 in which said means for commanding is responsive to said means for determining the number of times to cease attempts to close the obstructed vent after a number of tries.

18. The venting system of claim 1 further including means for determining when the vehicle is violently jarred.

19. The venting system of claim 18 in which said means for operating is responsive to said means for determining for fully opening all of the motor-operated vents when the vehicle is violently jarred to provide a vehicle escape path in an accident.

20. The venting system of claim 1 further including means for detecting sunlight in the vehicle.

21. The venting system of claim 20 further including means for shading at least part of one of the vehicle windshields.

22. The venting system of claim 21 in which said means for shading is responsive to said means for resolving the vehicle temperature and said means for detecting sunlight for operating said means for shading when the interior temperature is above the preselected threshold and sunlight is detected.

23. The venting system of claim 1 further including means for determining when all of the vehicle doors are locked.

24. The venting system of claim 23 in which said means for commanding closes all of the motor-operated vents when said means for detecting detects the presence of a being after all of the doors are locked to deter vehicle theft.

25. The venting system of claim 1 in which said means for commanding is further responsive to said means for resolving for closing the open vents when the interior temperature falls below a preselected threshold temperature.

26. The venting system of claim 1 further including means for heating the vehicle steering wheel.

27. The venting system of claim 26 in which said means for heating is responsive to said means for resolving for only heating the steering wheel when the interior temperature falls below a preselected threshold temperature.

28. The venting system of claim 1 in which said means for commanding closes the open vehicle vent when said means for detecting no longer detects a living being.

* * * * *